United States Patent Office 3,020,591
Patented Feb. 13, 1962

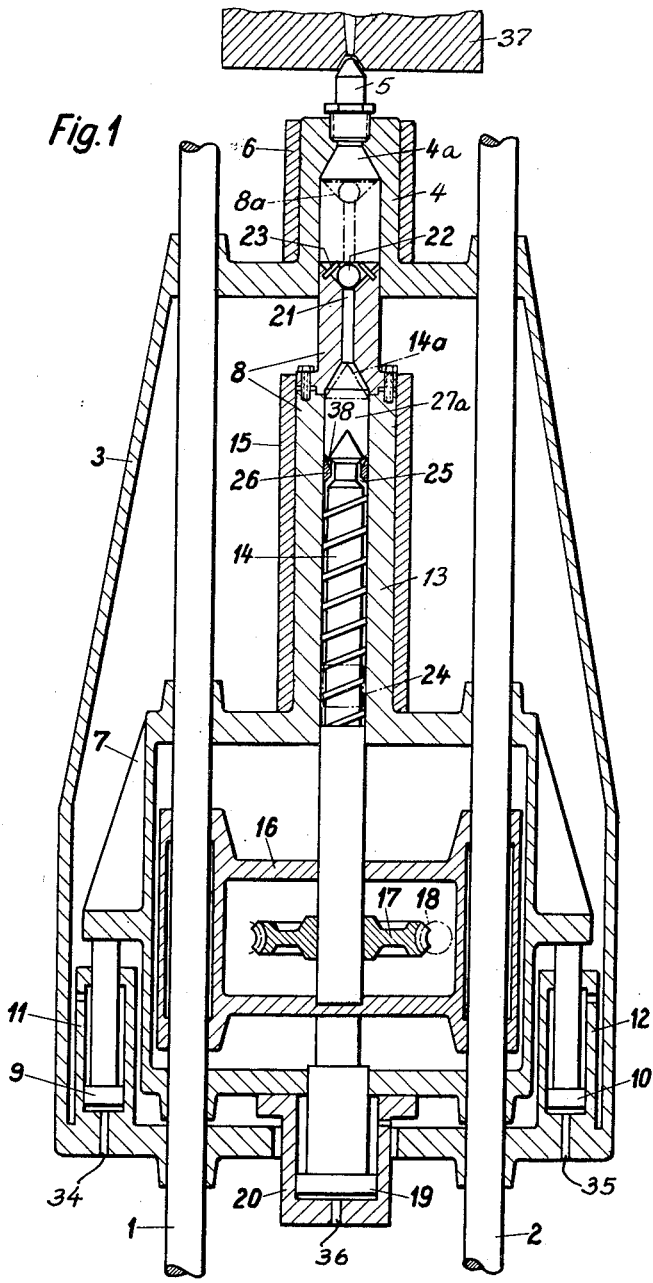

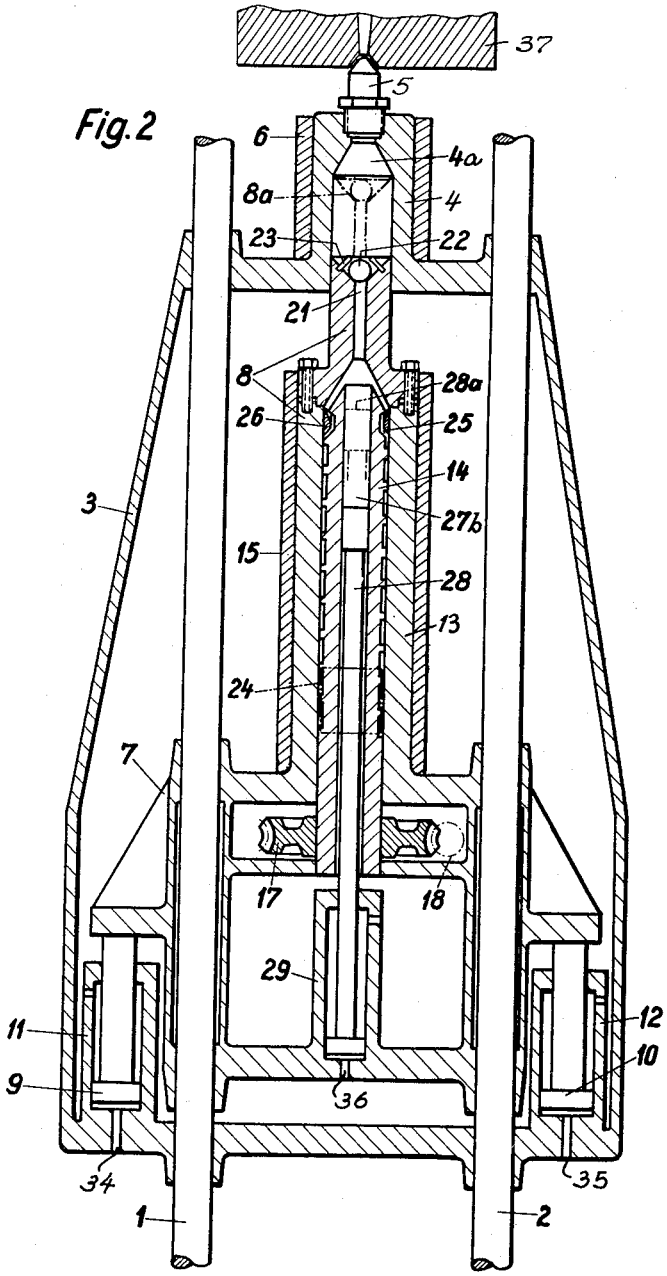

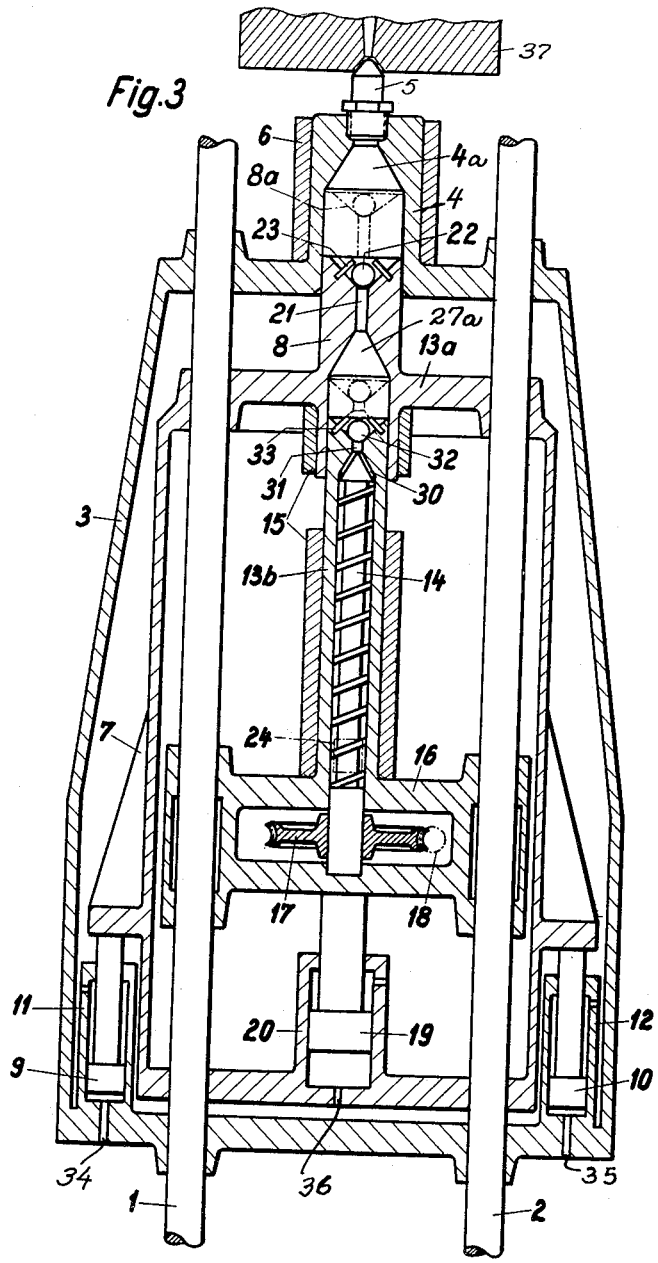

3,020,591
INJECTION MOLDING MACHINE
Rudolf Breher and Friedrich Berndt Bielfeldt, Bad Oeynhausen, Germany, assignors to Friedrich Stubbe, Vlotho (Weser), Germany
Filed Jan. 19, 1960, Ser. No. 3,338
Claims priority, application Germany Jan. 26, 1959
7 Claims. (Cl. 18—30)

The present invention relates to an injection molding machine for thermoplastic material and, more particularly, concerns an injection molding machine of this type which is provided with an injection piston axially displaceable in a material receiving cylinder, and which is further provided with a feeding worm rotatable in a heating cylinder.

Injection molding machines are known in which a piston is axially displaceable in a cylinder, and in which the material to be injected is periodically introduced into a heating cylinder and by means of said piston is pressed through the heated cylinder so that the material will be gradually softened. With each piston stroke, softened material is injected by means of an injection nozzle into a mold.

Due to shrinkage of the material caused by its cooling in the injection mold, it is necessary that during the cooling-off period the piston exerts an additional or post-pressure. Piston injection molding machines have the well-known advantage that the post-pressing can be effected without difficulties. On the other hand, it is known that these machines have the drawback that the thick plug formed by the material in the heating cylinder softens only slowly and unevenly because injection molding materials usually have a very low heat conductivity. This drawback cannot be completely avoided even though complicated and expensive heating cylinders of various designs have been employed which are provided with heated inserts or ribs extending into the injection molding material. Especially when injection molding materials are employed which are chemically not very stable or are highly sensitive against overheating, there exists the danger that either portions of said plug are heated or softened insufficiently or that portions of said plug are heated for too long a time and at too high temperatures so that the injection molding material will burn and will chemically deteriorate. This danger is present especially when the material flows unevenly, for instance when parts of the material are retained by protrusions or in gaps or grooves so that they will burn at said protrusions or in said gaps and later, when released and flowing on, get into the injection mold where they will cause discoloration of the work piece or faulty portions in said work piece.

It is known to avoid the above mentioned drawbacks by providing the injection molding machines with a feeding worm rotatable and axially displaceable in the heating cylinder of the injection molding machine. With this known type of machines, the material is first passed by the rotating feeding worm along the heated cylinder walls in form of a thin layer to thereby uniformly heat the molding material to the desired temperature while softening said material. The plastic material is then fed into a cylinder chamber in front of the worm and is pressed by a feeding stroke of the worm through the injection nozzle into the mold. The plurality of machines of this type has, however, the drawback that the worm must continuously rotate not only during the injection stroke but also during the post-pressing period in order to prevent the plastic material from flowing back through the worm threads and from losing the required pressure. In this connection, there exists the danger that frictional heat will be produced by the rotating worm. This heat may cause local overheating, particularly when thermally sensitive materials are involved, whereby burning of the material and chemical deterioration thereof may be produced. In an effort to obviate these drawbacks, arrangements have been made intended to make it possible to inject and post-press with the worm at a standstill. Thus, for instance, a feeding worm has been employed the front end of which has been designed as piston. When the worm has been retracted, the piston will be located at a portion of the cylinder with such a great diameter that the soft material can flow around the piston into the cylinder chamber in front of the worm. When the worm is moved in feeding direction, its piston-shaped point closely engages the wall of the cylinder which latter has a smaller diameter at its front end so that no soft material can flow back along the piston-shaped point of the worm and through the worm threads. In this way, it will be possible to inject and post-press with the worm at a standstill. All of the above machines with a feeding worm still have the drawback that during the injection and during the post-pressing operation, the softening of new material for the next injection cycle will be interrupted. Only when the worm is retracted again, will it be possible to feed new material into the work thread and to soften said material while softened material will be fed from the work into the cylinder chamber ahead of the worm.

By employing injection molding machines having an injection piston axially displaceable in a material-receiving cylinder, and by further employing a feeding worm rotatable in a heating cylinder, it has been attempted to combine the advantages of the above mentioned prior art machine types and to avoid the drawbacks of the said two machine types.

According to one of these known injection molding machines, a heating cylinder comprising a rotatable feeding worm leads laterally into a material-receiving cylinder in which an injection piston is axially displaceably arranged. In its retracted position, the injection piston releases the mouth of the heating cylinder so that by advancing the worm, the soft material may be pressed from the heating cylinder into the material-receiving cylinder. No particularly high pressure is required for this purpose. When advancing the injection piston, the latter closes the mouth and presses the soft material from the material-receiving cylinder through the injection nozzle into the injection mold in which instance high pressures may be produced. During the injection, and also during the post-pressing period, the worm continues to work in the heating cylinder and is again returned to its retracted position while the softened material in the heating cylinder will be collected in front of the worm. This machine, however, has the drawback that the said softened material may, during the advance of the worm and only then, be pressed into the material-receiving cylinder after the injection piston has been returned to its retracted position and the mouth of the heating cylinder has again been released. Consequently, by the return stroke of the injection piston, a vacuum will be produced in the material-receiving cylinder. In spite of the employment of a complicated valve in the injection nozzle for which a complicated control arrangement is required, air cannot be prevented from being drawn into the material-receiving cylinder by the vacuum in the latter. This is due because in practice, for instance in view of the occurring wear, it is impossible to obtain a 100% seal of the nozzle valve and of the injection piston in the material-receiving cylinder. The air entering the material receiving cylinder produces air bubbles in the injection material so that the injected articles will either be faulty or completely useless.

According to another heretofore known injection molding machine, there is likewise provided a material-receiving cylinder with an injection piston and a separate heating cylinder arranged at an angle to said material-receiving cylinder. With this heretofore known machine, the two cylinders are interconnected by a passage which leads laterally into the material-receiving cylinder and passes by the front end thereof. When the injection piston performs an advance stroke, a valve in said passage closes and prevents the material from flowing back into the heating cylinder from the material-receiving cylinder. When the injection piston performs its return stroke, the said valve opens, and soft material is pressed from the heating cylinder into the material-receiving cylinder ahead of the injection piston. In view of the above mentioned arrangement of the material-receiving cylinder and heating cylinder relative to each other, the machine is rather complicated in construction and requires a considerably large space.

Also injection molding machines are known which comprise a heating cylinder provided with a rotatable feeding worm, in which two passages lead to the front end of two material-receiving cylinders both of which are provided with an injection piston. By means of valves or slides in said passages, the heating cylinder is alternately connected with the two material-receiving cylinders. While one passage is open and one of the material-receiving cylinders is filled from the heating cylinder, in which instance the respective injection piston is moved rearwardly, the other passage to the other material-receiving cylinder will be closed so that the injection piston thereof may be advanced for carrying out an injection process. With one of these machines, each of the two injection pistons is provided with an injection nozzle of its own so that also two injection molds will be required which will alternately receive the material through the respective injection nozzles.

According to one of the heretofore known machines of the last mentioned type, one injection nozzle only is provided from which two passages lead to the two material-receiving cylinders. The two passages are alternately opened and closed by a valve spool or the like. Also these machines are, due to the numerous valve spools, valves and control members for the slides and valves and also for the two injection pistons, relatively expensive and complicated in construction and manufacture and therefore require a considerable space.

It is, therefore, an object of the present invention to provide an injection molding machine which will overcome the above mentioned drawbacks.

It is another object of this invention to provide an injection molding machine in which, while combining the advantages of a machine equipped with an injection piston and of a machine equipped with a feeding worm, the drawbacks of the said machine types will be obviated.

It is another object of this invention to provide an injection molding machine of the type set forth in the preceding paragraphs, which will permit a continuous, careful and gentle plastification of the injection molding material.

It is still another object of this invention to provide an injection molding machine as set forth in the preceding paragraphs, which will obviate the drawbacks of the heretofore known machines of the type involved while being simple and inexpensive in manufacture, construction and operation and also being highly efficient and reliable.

These and other objects and advantages of the invention will appear more clearly from the following specification in connection with the accompanying drawings, in which:

FIG. 1 is a longitudinal section through a first embodiment of the present invention.

FIG. 2 is a longitudinal section similar to that of FIG. 1 through a modified design of the present invention.

FIG. 3 represents a longitudinal section through a further modification of an injection molding machine according to the invention.

The present invention, which concerns an injection molding machine for thermoplastic material with a material-receiving cylinder having an injection piston axially displaceably mounted therein, and with a feeder worm rotatable in a heating cylinder, is characterized primarily in that the heating cylinder with the feeding worm is axially arranged in the injection piston, and that the outlet opening of the heating cylinder leads into the material-receiving cylinder.

More specifically, with reference to the drawings and FIG. 1 thereof in particular, the injection molding machine according to FIG. 1 has two rails or bars 1 and 2 having journalled thereon a main carriage 3 having a cylinder body 4 with a material receiving cylinder 4a which latter communicates with an injection nozzle 5. The cylinder 4 and injection nozzle 5 are kept warm by a heating element 6. The main carriage 3 is in a manner known per se displaceable on rails 1 and 2 so that the injection nozzle 5 can be moved into engagement with the inlet of an injection mold 37. It is, of course, to be understood that instead also the injection mold with the closing means therefor may be displaceable so as to be able to be moved into contact with the injection nozzle 5.

In the main carriage 3 and on the rails 1 and 2 there is displaceably mounted an injection carriage 7 with an injection piston 8. Carriage 7 is connected to the main carriage 3 by means of hydraulically operable feeding pistons 9 and 10 reciprocably mounted in feeding cylinders 11 and 12 of the main carriage 3. It will thus be evident that when moving the main carriage 3, the latter is adapted to carry along the injection carriage 7. On the other hand, the injection carriage 7 may also be moved relative to the main carriage 3 by actuating the feeding pistons 9 and 10. In such an instance, the injection piston 8 will with its front end axially move in the material-receiving cylinder 4a.

Within the injection piston 8 there is provided a heating cylinder 13 having a feeder worm 14 rotatably mounted therein. The upper end of said cylinder 13 above the front end of worm 14 confines a storage chamber 27a the volume of which varies with the movement of feeder worm 14 relative to cylinder 13 for a purpose to be explained later. The heating of the heating cylinder 13 may be effected by a heating element 15.

Within the injection carriage 7 and mounted on the rails 1 and 2 is a motor carriage 16 having the feeder worm 14 journalled therein. Within said motor carriage 16 and rotatably connected to feeder worm 14 is a worm wheel 17 drivingly connected to a worm 18 which latter is mounted on the motor shaft of a prime mover. The said prime mover, which is likewise journalled in the motor carriage 16, has not been shown in the drawings in order to avoid unnecessarily clogging up the drawings. The arrangement is such that when the motor carriage 16 moves on rails 1 and 2 in a manner to be described further below, the worm wheel 17 mounted on the feeder worm 14 in motor carriage 16 and the worm 18 mounted on the shaft of the prime mover in motor carriage 16 do not change their position relative to each other.

Motor carriage 16 may be fixedly connected to the main carriage 3 so that the two carriages 3 and 16 form an entirety with each other which can be displaced on rails 1 and 2 as a unit only. Carriages 3 and 16 may for instance be interconnected by a bar which takes the place of piston 19 to be described further below and will have its two ends rigidly connected to carriages 3 and 16. With this arrangement, which is not shown in the drawings, only the injection carriage 7 may be displaced on rails 1 and 2 independently of said unit comprising carriages 3 and 16.

With the just described embodiment, it will be evident that when the injection carriage 7 carries out a rearward movement, said carriage 7 would slide further above worm 14 whereby the softened injection material would be pressed out of the storage chamber 27a into the material-receiving cylinder 4a the free space of which would be increased by the rearward movement of carriage 7. Inversely, during a forward movement of the injection carriage 7, the material would be injected from the cylinder 4a through nozzle 5 while simultaneously the volume of storage chamber 27a would increase so that the feeder worm therein would be able again to feed softened material. The only difference between such an arrangement over the arrangement of FIG. 1 consists in that when by advancing the injection carriage 7, cylinder 4a has been completely emptied, no additional material could be pressed by worm 14 from storage chamber 27a directly through nozzle 5 by merely advancing the motor carriage 16 movable by itself. Assuming the same dimensions of all parts in both instances, it will be evident that the machine of FIG. 1 will, therefore, be able to injection mold larger parts because both cylinders or chambers (4a and 27a) can be emptied during an injection molding operation, whereas with the above described modification, always one discharge only from chamber 27a into cylinder 4a can be effected during the retraction of the injection carriage 7, and inversely only one discharge of the cylinder 4a can be effected when advancing the injection carriage 7.

According to a particularly advantageous embodiment of the machine according to the present invention, the motor carriage 16 is connected to the injection carriage 7 by means of a hydraulically operable piston 19 which latter is adapted to move in a cylinder 20 of the injection carriage 7. In this way, the motor carriage 16 is adapted to be carried along by the injection carriage 7 when the latter is displaced. On the other hand, by actuating the piston 19, motor carriage 16 is displaceable relative to the injection carriage 7 while the feeder worm 14 is axially displaced in injection piston 8 and in the heating cylinder 13. The advantage of such a machine will be evident from the operation of the machine as described further below. The front end of the storage chamber 27a is provided with a discharge opening 21 which leads into the material-receiving cylinder 4a. According to a further development of the invention, a check valve comprising a valve ball 22 and a cage 23 for ball 22 is provided in the discharge opening 21.

According to a further development of the machine according to the invention, the front end of the feeder worm 14 is provided with a passage 25 in which an annular valve body 26 is arranged. Valve body or valve ring 26 seals the front end of feeder worm 14 with regard to the wall of the heating cylinder 13. Ring 26 has its front end provided with ribs 38 forming passages therebetween. Within the annular groove at the head of feeder worm 14, ring 26 is adapted slightly to move in axial direction of the worm. When ring 26 is moved forwardly, for instance when the material being fed by the feeder worm presses against said ring 26, or when the feeder worm 14 is retracted in the heating cylinder 13, ring 26 releases the passage 25 between ring 26 and the head of the feeder worm 14 as will be evident from FIG. 1, so that the material can flow through passage 25 and the passages between ribs 38. However, when the feeder worm is moved forwardly for instance in order to eject the material from storage chamber 27a the said material will exert a pressure upon the front of ring 26 and will push the latter back so that its rear surface will engage the wall of the annular groove in the head of the feeder worm. As a result thereof, the passage 25 will be closed. In this way, no material can pass backwards into the threads of the feeder worm. The injection molding machine according to the invention as described above, may for instance be actuated in the following manner:

*Operation of injection molding machine of FIG. 1*

First the main carriage 3 is advanced in order to press the injection nozzle 5 against the injection mold 37. During this advance of the main carriage 3, the latter carries along the injection carriage 7 and the motor carriage 16. Thereupon the motor carriage 16 is advanced by means of the piston 19 in carriage 7 and in main carriage 3, whereby the feeder worm 14 within the injection piston 8 is advanced to the position 14a indicated in dot-dash lines, and softened injection material is pressed out of the storage chamber 27a into cylinder 4a through the now opening check valve 22, 23. Thereupon the injection carriage 7 is advanced by pistons 9 and 10 in main carriage 3 so that the injection piston 8 is advanced into the material receiving chamber or cylinder 4a to the position 8a indicated by dot-dash lines. During this movement, the check valve 22, 23 closes again, and injection molding material is pressed out of cylinder 4a through injection nozzle 5 into the mold 37. While the injection carriage 7 was advanced, it took along the motor carriage 16 so that no vacuum can build up in the heating cylinder 13. During the now following post-pressing period, no pressure will be exerted upon the piston 19 of the motor carriage 16 so that the feeder worm 14 working uninterruptedly will again feed softened injection molding material into the heating cylinder 13 while thus simultaneously moving back to its starting position. The injection molding material to be softened will be conveyed to the feeder worm 14 through a charging opening 24 of piston 8, said charging opening being located above the feeder worm 14. During the next following injection step, first the injection carriage 7 with piston 8 is returned within main carriage 3 while simultaneously motor carriage 16 with feeder worm 14 is advanced in injection carriage 7. Consequently, softened injection material is fed from storage chamber 27a into the material-receiving cylinder 4a and no vacuum can form in cylinder 4a. Subsequently, the injection carriage 7 with the injection piston 8 is again advanced in the above mentioned manner for carrying out the next injection step. The speed of rotation of the feeder worm 14, and the heating of the heating cylinder 13 by the heating element 15 may be tuned to each other in such a way that after completion of an injection cycle, the quantity of softened injection material required for the next injection step will have been fed by the feeder worm 14 into that chamber portion of the heating cylinder 13 which is located ahead of the worm. The above injection molding machine makes it possible to deviate from the above outlined operational steps and to adapt the operation of the machine to the respective operative conditions as for instance the size of the products to be produced or the speed at which the individual injecting steps succeed each other. Thus, for instance, during the injection step it is possible for a short period to release the pressure from the pistons 9, 10 of the injection carriage 7 while simultaneously advancing motor carriage 16 for a brief period so that any softened injection material will be pressed out of cylinder 13 into cylinder 4a, and injection carriage 7 will be moved slightly backwards. During this operation, valve 25, 26 will close for a brief period, and the required injection pressure will be exerted for a brief period by feeder worm 14. In this way, the machine according to the invention makes it possible to produce also injection molding parts for which the injection molding machine was actually not designed. In other words, it is possible to produce work pieces with a volume which is in excess of the filling volume of the cylinder 4a or storage chamber 27a. This advantage can also be obtained by the injection molding machines according to FIG. 2 and 3.

The injection molding machine shown in FIG. 2 differs from that of FIG. 1 primarily in that it lacks the motor carriage 16 of FIG. 1 with piston 19 and cylinder 20. Instead, according to FIG. 2, the feeder worm 14 is rotatably mounted in the injection carriage 7. Also the driving gears 17 and 18 and the prime mover (not shown in the drawings) for driving feeder worm 14 are arranged in the injection carriage 7. Therefore, the feeder worm 14 cannot be displaced axially in the heating cylinder 13. Instead the feeder worm 14 is provided with a storage chamber 27b having displaceably mounted therein one end of a double piston 28 the other end of which is reciprocably mounted in a cylinder 29 of the injection carriage 7.

*Operation of injection molding machine of FIG. 2*

The softened injection molding material passing through the threads of the feeder worm 14 pushes the valve ring 26 into its opening position and further passes through the passage 25 into that portion of heating cylinder 13 which is located in front of the feeder worm 14. From here the said material enters the chamber 27b serving as storage chamber and pertaining to feeder worm 14 whereby the said material presses the double piston 28 backwards. When the double piston 28, due to the admittance of actuating fluid in cylinder 29, is moved to the position 28a indicated in dot-dash lines, the softened injection molding material is pressed from storage chamber 27b through the opening check valve 22, 23 into the material-receiving cylinder 4a. While this occurs, the injection carriage 7 with injection piston 8 is retracted. Subsequently, injection carriage 7 with injection piston 8 is again advanced so that the injection molding material is pressed out of cylinder 4 through injection nozzle 5 while check valve 22, 23 closes again.

If during the injecting operation, the quantity of material in cylinder 4a is to be supplemented by material from the heating cylinder 13, the pressure upon pistons 9 and 10 is reduced, and double piston 28 is advanced so that softened material from heating cylinder 13 and storage chamber 27b is pressed through the now opening check valve 22, 23 into cylinder 4a while carriage 7 with injection piston 8 may be somewhat retracted. During this period, which may be selected rather short, the required high injection pressure can be produced by the double piston 28 in which instance valve 25, 26 closes so that no softened injection material can flow back through the threads of the feeder worm 14.

Referring now to the injection molding machine of FIG. 3, this machine differs from the machine of FIG. 1 primarily in the following manner. The heating cylinder 13 is sub-divided into a heating cylinder portion 13a arranged in the injection piston 8 of the carriage 7 and comprising the storage chamber 27a, and into a piston-shaped heating cylinder portion 13b arranged on the motor carriage 16 and surrounding feeder worm 14 and axially displaceably mounted in cylinder portion 13a. Feeder worm 14 will thus be able to rotate in the inner bore 30 of the piston-shaped cylinder portion 13b. The outlet opening 31 of bore 30 leads into the heating cylinder portion 13a.

According to a further development of the machine, a check valve comprising a valve ball 32 and cage 33 therefor is arranged in the outlet opening 31. Instead of the check valve 32, 33, it is, of course, also possible to employ valve 25, 26 of the machine according to FIG. 1. The operation of the machine according to FIG. 3 corresponds to that of FIG. 1.

The machines of FIGS. 1 to 3 are provided with connections 34, 35 for admitting actuating fluid to the cylinder piston systems 9, 11 and 10, 12. The machines of FIGS. 1 to 3 are furthermore provided with connections 36 for admitting actuating fluid to the respective cylinders 29 and 29. The said various connections may be hooked up by flexible hoses or the like to a pressure fluid supply circuit comprising manually operable valves (not shown) for individually controlling the operation of the various pistons. It is, of course, understood that if desired, the various cylinder piston systems may be actuated in a predetermined sequence, in which instance the respective valves could be operated automatically in a manner known per se by standard control means.

It is also to be understood that the present invention is, by no means, limited to the particular constructions shown in the drawings but also comprises any modifications within the scope of the appended claims.

What we claim is:

1. In an injection molding machine: a molding material receiving cylinder, an injection nozzle communicating with said material receiving cylinder for receiving molten molding material therefrom and injecting the same into a mold, an injection piston extending into and movable relative to said material receiving cylinder in axial direction thereof, first actuating means for effecting movement of said injection piston and said material receiving cylinder relative to each other a heating cylinder arranged within and in substantially axial alignment with said injection piston for heating molding material, a rotatable feeder worm extending into and rotatable in said heating cylinder for conveying molding material into said heating cylinder, means for admitting molding material to said feeder worm passage means for effecting communication between said heating cylinder and said material receiving cylinder, said feeder worm and said heating cylinder comprising wall portions of a storage chamber variable in volume, said storage chamber comprising at least one wall portion movable relative to said heating cylinder in axial direction thereof for alternately increasing and decreasing the volume of said storage chamber to thereby respectively fill said storage chamber by means of said feeder worm with a certain charge of molding material and to discharge plasticized material from said storage chamber into said material receiving cylinder, second actuating means operable independently of said first actuating means for effecting movement of said last mentioned wall portion relative to said heating cylinder, and means arranged in said passage means and permitting the flow of molding material from said heating cylinder to said material receiving cylinder while preventing the flow of said last mentioned material in reverse direction.

2. An injection molding machine according to claim 1, in which said feeder worm is axially displaceable in said heating cylinder.

3. An injection molding machine according to claim 1, which includes a check valve arranged in said passage means.

4. In an injection molding machine: a molding material receiving cylinder, an injection nozzle communicating with said material receiving cylinder for receiving molten molding material therefrom and injecting the same into a mold, an injection piston extending into and movable relative to said material receiving cylinder in axial direction thereof, said injection piston comprising a storage chamber and passage means for establishing communication between said storage chamber and said material receiving cylinder, heating means surrounding said storage chamber, a heatable hollow piston extending into said storage chamber and movable relative thereto, said hollow piston comprising an axial bore adapted to communicate with the interior of said storage chamber, said axial bore having an inlet opening for admitting molding material thereinto, a rotatable feeder worm rotatably mounted in said axial bore for conveying molding material therefrom into said storage chamber, first actuating means for effecting movement of said injection piston and said material receiving cylinder relative to each other, second actuating means operable independently of said first actuating means for moving said hollow piston relative to said injection piston for alternately increasing and decreasing the volume of said storage chamber to thereby respectively fill said storage chamber by means of said feeder worm with a certain charge of molding material and to discharge plasticized material from said storage chamber into said material receiving cylinder, and means arranged in said passage means and permitting the flow of molding material from said storage chamber to said material receiving cylinder while preventing the flow of molding material from said material receiving cylinder to said storage chamber.

5. An injection molding machine according to claim 4, in which said hollow piston comprises passage means establishing communication between said axial bore and said storage chamber, and check valve means located in said last mentioned passage means for permitting the flow of molding material from said axial bore to said storage chamber and preventing the flow of molding material from said storage chamber into said axial bore.

6. In an injection molding machine: a molding material receiving cylinder, an injection nozzle communicating with said material receiving cylinder for receiving molten molding material therefrom and injecting the same into a mold, an injection piston extending into and movable relative to said material receiving cylinder in axial direction thereof, first actuating means for effecting movement of said injection piston and said material receiving cylinder relative to each other, a heating cylinder arranged within and in substantially axial alignment with said injection piston for heating molding material, a rotatable feeder worm rotatable in said heating cylinder for conveying molding material thereinto, said feeder worm having a reduced portion near the front end thereof, inlet means for admitting molding material to said feeder worm, valve means extending into said reduced portion and sub-dividing said heating cylinder into a rear section and into a front section representing a storage chamber variable in volume, said valve means being movable in response to a certain pressure in said rear section to move into a first position for establishing communication between said rear section and said storage chamber, said valve means also being movable into a second position in response to a certain pressure in said storage chamber for interrupting communication between the latter and said rear section, passage means for effecting communication between said storage chamber and said material receiving cylinder, second actuating means operable independently of said first actuating means for effecting relative movement between said feeder worm and said storage chamber to alternately increase and decrease the volume of said storage chamber to thereby respectively fill said storage chamber by means of said feeder worm with a certain charge of molding material and to discharge plasticized material from said storage chamber into said material receiving cylinder, and means arranged in said passage means and permitting the flow of molding material from said storage chamber to said material receiving cylinder while preventing the flow of molding material in reverse direction.

7. An injection molding machine according to claim 1, in which said feeder worm is provided with an axial bore, and in which one wall portion of said storage chamber is formed by the front end of a plunger reciprocable in said axial bore.

References Cited in the file of this patent

UNITED STATES PATENTS

| | | |
|---|---|---|
| 2,616,130 | Banz | Nov. 4, 1952 |
| 2,668,986 | Miler | Feb. 16, 1954 |
| 2,746,089 | Hendry | May 22, 1956 |
| 2,885,734 | Wucher | May 12, 1959 |

FOREIGN PATENTS

| | | |
|---|---|---|
| 1,144,411 | France | Oct. 14, 1957 |
| 845,855 | Germany | Aug. 7, 1952 |